(12) United States Patent
Salo et al.

(10) Patent No.: US 12,200,052 B1
(45) Date of Patent: Jan. 14, 2025

(54) ADAPTING UNRELIABLE DATA SINK TO RELIABLE STREAM

(71) Applicant: INTERNATIONAL BUSINESS MACHINES CORPORATION, Armonk, NY (US)

(72) Inventors: Tiia Jenna Salo, Cary, NC (US); Christopher M Dye, Encinitas, CA (US); Jonathan Dye, Lindon, UT (US); Michael James Dye, West Valley City, UT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/501,370

(22) Filed: Nov. 3, 2023

(51) Int. Cl.
G06F 15/16 (2006.01)
H04L 67/1095 (2022.01)
H04L 67/1097 (2022.01)

(52) U.S. Cl.
CPC ...... H04L 67/1095 (2013.01); H04L 67/1097 (2013.01)

(58) Field of Classification Search
None
See application file for complete search history.

(56) References Cited

U.S. PATENT DOCUMENTS

| | | |
|---|---|---|
| 6,378,129 B1 | 4/2002 | Zetts |
| 7,159,234 B1 | 1/2007 | Murphy |
| 8,392,748 B2 | 3/2013 | Bocharov |
| 8,607,091 B2 | 12/2013 | Asbun |
| 9,215,260 B2 | 12/2015 | Galanes |
| 9,237,101 B2 | 1/2016 | Chen |
| 2007/0112714 A1* | 5/2007 | Fairweather ............ G06F 8/427 706/46 |
| 2011/0083037 A1 | 4/2011 | Bocharov |

(Continued)

FOREIGN PATENT DOCUMENTS

EP 1866788 B1 12/2007

OTHER PUBLICATIONS

SRCE CDE, "Handle SQS message failure in batch with partial batch response feature," Medium.com [online], Dec. 12, 2021 [accessed on Jun. 28, 2023], 12 pages, Retrieved from the Internet: <URL: https://medium.com/srcecde/handle-sqs-message-failure-in-batch-with-partial-batch-response-b858ad212573>.

*Primary Examiner* — Phuoc H Nguyen
(74) *Attorney, Agent, or Firm* — Daniel J Blabolil

(57) ABSTRACT

According to at least one embodiment, a method, a computer system, and a computer program product for handling an unreliable data sink is provided. The present invention may include reading, continuously, via a stream processor, a batch of data entering the stream processor via a reliable input stream, the stream processor comprising a daisy chain of sink nodes, wherein a first sink node is a primary sink node and a subsequent plurality of sink nodes in the daisy chain are fallback sink nodes; outputting processed data to a non-streaming target system; upon completion of the processed data to the non-streaming target system, invoking an asynchronous callback function listing successful and failed record IDs of the processed data; and passing the failed records to a first fallback sink within the daisy chain, while the primary sink node concurrently continues submitting new batches of data to the non-streaming target system.

20 Claims, 5 Drawing Sheets

(56) References Cited

U.S. PATENT DOCUMENTS

| | | |
|---|---|---|
| 2011/0167304 A1 | 7/2011 | Asbun |
| 2017/0131994 A1* | 5/2017 | Middleton .............. H04W 4/80 |
| 2020/0225655 A1* | 7/2020 | Cella ................ G05B 19/41875 |
| 2020/0348662 A1* | 11/2020 | Cella ................ G05B 19/41865 |
| 2021/0157312 A1* | 5/2021 | Cella ................... G01M 13/045 |
| 2021/0160548 A1 | 5/2021 | Ziskind |
| 2022/0108262 A1* | 4/2022 | Cella ............... G05B 19/41885 |
| 2023/0023083 A1* | 1/2023 | Shelton, IV ............ H04L 65/80 |

\* cited by examiner

ADAPTING UNRELIABLE DATA SINK TO RELIABLE STREAM

BACKGROUND

The present invention relates generally to the field of data movement and, in particular, to adapting unreliable data sinks to a reliable data stream.

Data streaming involves continually transferring data from one or more reliable data sources at high speed for processing into specific outputs, such as a data sink or a subscriber. However, oftentimes one or more of the specific outputs can be unreliable. The presence of an unreliable data sink can result in an impedance mismatch between the reliable streaming data source and the unreliable, non-streaming data sink. As a result, data loss can occur.

SUMMARY

Embodiments of a method, a computer system, and a computer program product for handling unreliable data sinks are described. According to one embodiment of the present invention, a method, computer system, and computer program product for handling an unreliable data sink is provided. The present invention may include reading, continuously, via a stream processor, a batch of data entering the stream processor via a reliable input stream, the stream processor comprising a daisy chain of sink nodes, wherein a first sink node of the daisy chain is a primary sink node and a subsequent plurality of sink nodes in the daisy chain are fallback sink nodes; outputting, via the stream processor, processed data to a non-streaming target system; upon completion of the processed data to the non-streaming target system, invoking on the primary sink node, an asynchronous callback function listing successful and failed record IDs of the processed data; and passing, via the primary sink node, one or more failed records to a first fallback sink within the daisy chain of sink nodes, while the primary sink node concurrently continues submitting one or more new batches of data to the non-streaming target system.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
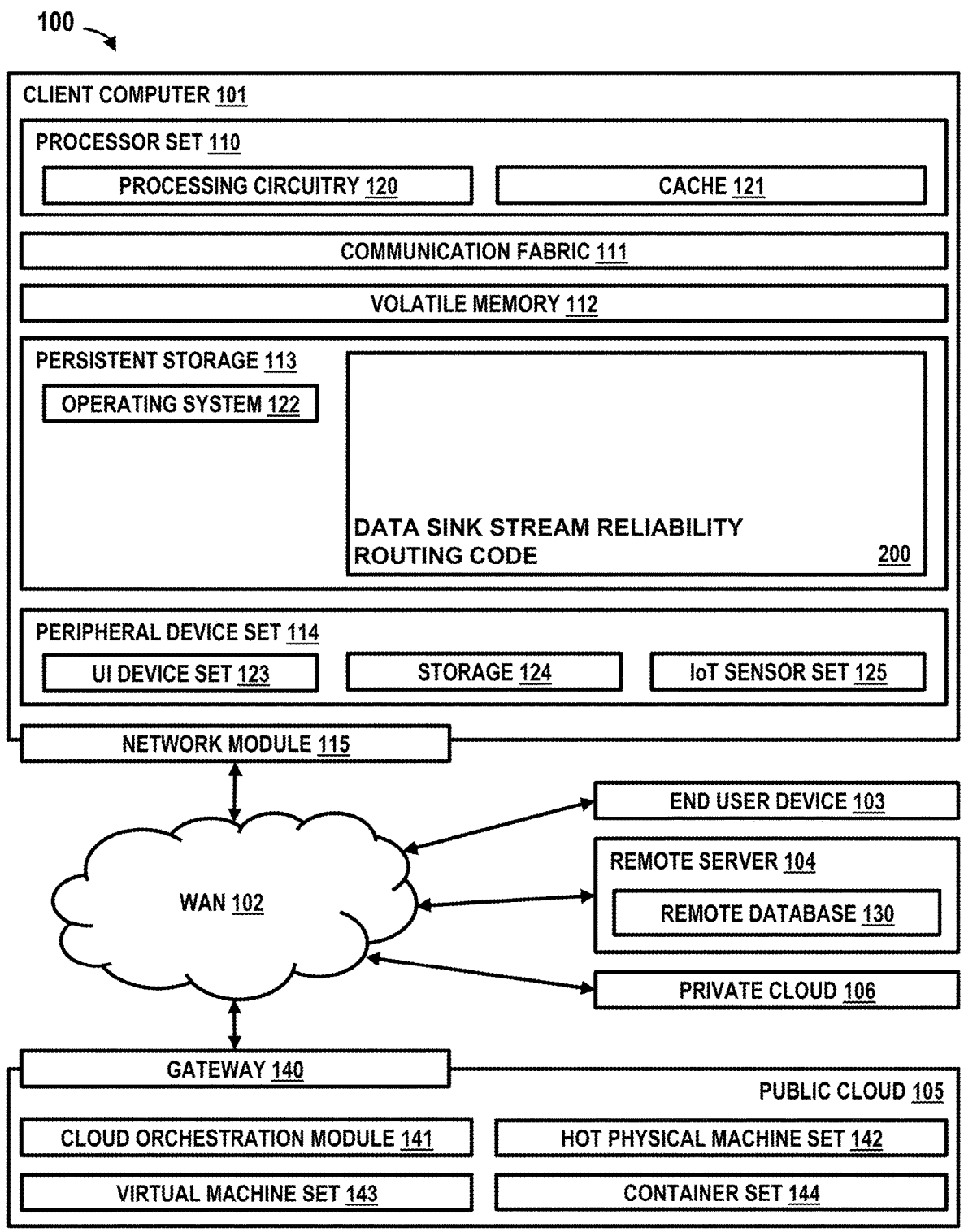
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Data streaming involves continually transferring data from one or more reliable data sources at high speed for processing into specific outputs, such as a data sink or a subscriber. However, if a data sink is unreliable, an impedance mismatch often results between the reliable streaming data source and the unreliable non-streaming data sink. The impedance mismatch can often stem from the inability of the target system to receive messages due to internal processing backlog, intermittent network outages, or other potential causes that affect streaming pipeline availability. Preventing an impedance mismatch between a reliable streaming data source and an unreliable, non-streaming data sink is important, particularly because an impedance mismatch can result in data loss.

An example of when such impedance mismatch occurs may involve data delivery from a streaming system to a full-text search engine using batch requests. Sometimes while merging its own indexes, the full-text search engine may reject batch requests. The request rejections are not atomic, i.e., part of a batch request may succeed, and part of the batch request may fail. Furthermore, the segments of the successful batch request and the segments of the failed records in the batch may not be continuous. For example, while attempting to deliver a batch of one thousand (1,000) records from a streaming system to the full-text search engine for indexing, the full-text search engine may momentarily freeze after the first three hundred (300) batch records and remain frozen until the batch is trying to write batch record eight hundred (800). As a result, records one through three hundred (1-300) and eight hundred through one thousand (800-1,000) can be delivered successfully, while batch records three hundred one through seven hundred ninety-nine (301-799) fail. Given that the full-text search engine can return the list of the successful and failed record IDs only after the batch completes, there can be no determinate stream offset that could be committed and that would effectively rewind the stream for re-delivery of the failed records. Additionally, the commit cannot be retried at batch record three hundred (300) because the successful commits between eight hundred through one thousand (800-1,000) would be ignored and resubmitted; likewise, the commit cannot be retried at one thousand (1,000) because the failures from three hundred through seven hundred ninety-nine (300-799) would be ignored and lost.

Therefore, preventing impedance mismatches between a reliable streaming data source and an unreliable, non-streaming data sink is important to prevent data loss. To further improve the prevention of impedance mismatches resulting from unreliable data sinks, there is a need to prevent data loss specifically caused by partially failed batch requests when delivering data to an unreliable, non-streaming target system.

Currently, the existing methods attempt to handle impedance mismatches resulting from unreliable data sinks using various methods. One way in which current methods attempt to address problems with impedance mismatches resulting from unreliable data sinks is by employing numerous secondary devices, such as full-time fallback servers/systems, to handle data loss at the network or system level. However, this approach requires additional hardware and software, therefore increasing costs. Additionally, this approach primarily handles continuous successes and failures, and thus, intermediate successes and failures persist. Another way in which current methods attempt to handle impedance mismatches resulting from unreliable data sinks is by rewinding an incoming data stream. However, rewinding a data stream blocks the continuous stream of incoming new data, resulting in reduced system performance as well as compounding the problem. Therefore, shortcomings remain with handling unreliable data sinks.

Embodiments of the present invention can remedy the above-mentioned deficiencies by providing a recovery mechanism that prevents data loss caused by partially failed batch requests while delivering data to an unreliable, non-streaming target system. Specifically, embodiments of the present invention can provide zero-message loss capability while only retransmitting failed data, wherein the data sink is too unreliable to receive messages upon a first transmission attempt. Additionally, embodiments of the present invention can employ "N" queues to handle unreceived messages by the unreliable sink, for retransmission, thereby ensuring all fallback occurs within the stream handler. Thus, all fallback occurs within the stream handler. Furthermore, embodiments of the present invention can provide on-demand queuing for only the necessary handling of failed messages in the case of the presence of an unreliable sink without employing full-time fallback duplicate servers/systems.

Embodiments of the present invention have the capacity to improve the prevention of data loss caused by partially failed batch requests when delivering data to an unreliable, non-streaming target system by providing a processor-implemented method, a computer system, and a computer program product for handling unreliable data sinks. Specifically, the present invention can read, continuously, via a stream processor, a batch of data entering the stream processor via a reliable input stream, the stream processor comprising a daisy chain of sink nodes, wherein a first sink node of the daisy chain is a primary sink node and a subsequent plurality of sink nodes in the daisy chain are fallback sink nodes, output, via the stream processor, processed data to a non-streaming target system, upon completion of the processed data to the non-streaming target system, invoke on the primary sink node, an asynchronous callback function listing successful and failed record IDs of the processed data, and pass, via the primary sink node, one or more failed records to a first fallback sink within the daisy chain of sink nodes, while the primary sink node concurrently continues submitting one or more new batches of data to the non-streaming target system.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for handling unreliable data sinks, comprising reading, continuously, via a stream processor, a batch of data entering the stream processor via a reliable input stream, the stream processor comprising a daisy chain of sink nodes, wherein a first sink node of the daisy chain is a primary sink node and a subsequent plurality of sink nodes in the daisy chain are fallback sink nodes, outputting, via the stream processor, processed data to a non-streaming target system, upon completion of the processed data to the non-streaming target system, invoking on the primary sink node, an asynchronous callback function listing successful and failed record IDs of the processed data, and passing, via the primary sink node, one or more failed records to a first fallback sink within the daisy chain of sink nodes, while the primary sink node concurrently continues submitting one or more new batches of data to the non-streaming target system.

Beginning now with FIG. 1, an exemplary networked computer environment 100 is depicted, according to at least one embodiment. Computing environment 100 contains an example of an environment for the execution of at least some of the computer code involved in performing the inventive methods, such as data sink stream reliability routing code 200, also referred to as data sink stream reliability routing program 200. In addition to code block 200 computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running an algorithm, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as application-specific integrated circuits ("ASICs"), copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

Figure 2:
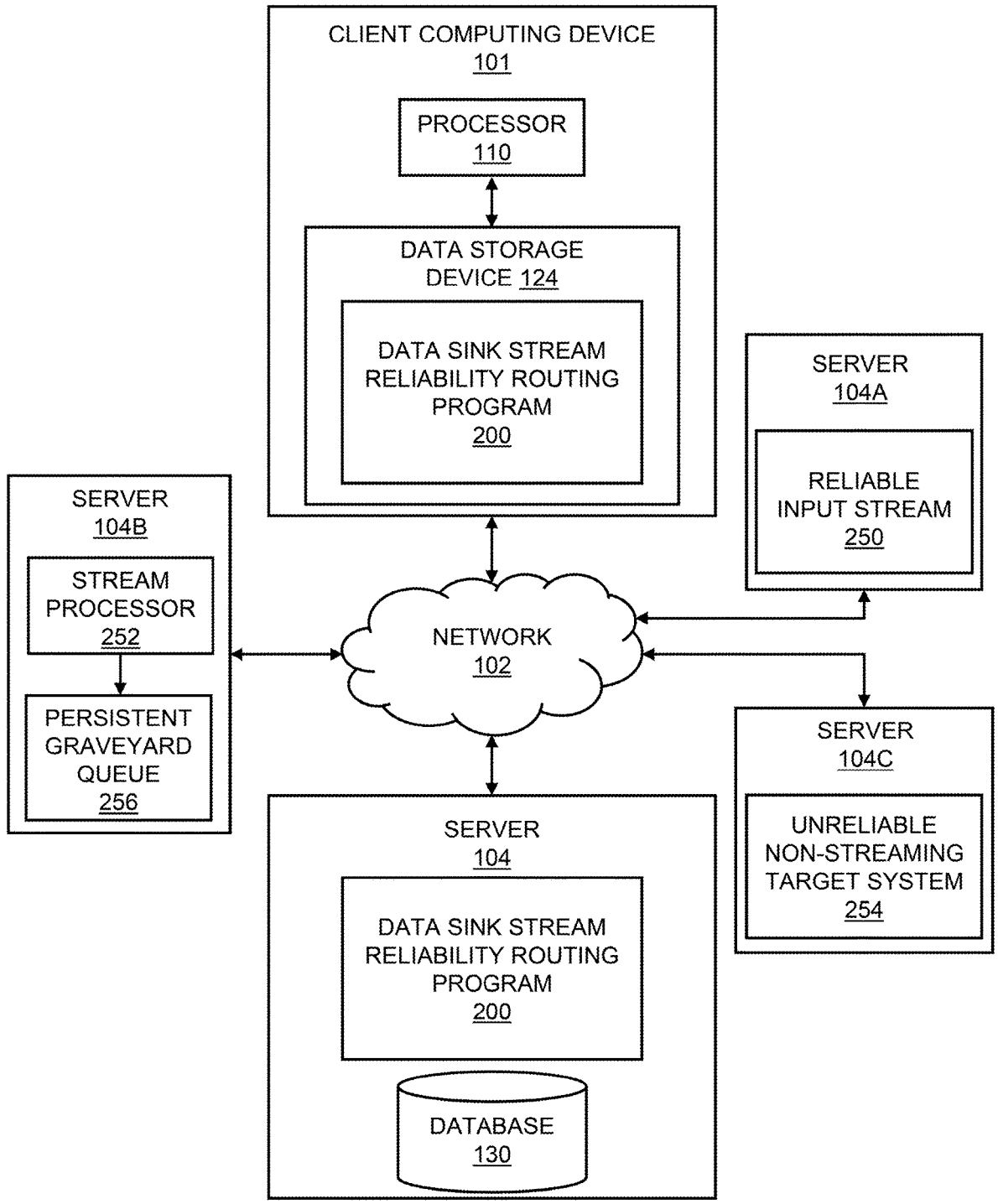
FIG. 2 illustrates an exemplary application invention environment according to at least one embodiment.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104. Remote Servers 104A, 104B, and 104C, shown in FIG. 2, are additional instances of remote server 104 as shown in FIG. 1.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, an exemplary application environment is depicted, according to at least one embodiment. FIG. 2 may include client computing device 101 and a remote server 104 interconnected via a communication network 102. Additionally, FIG. 2 may include remote servers 104A, 104B, and 104C. Remote server 104A may comprise reliable input stream 250. Remote server 104B may comprise stream processor 252 and persistent "graveyard" queue 256. Remote server 104C may comprise an unreliable non-streaming target system 254, also referred to as "external sink". According to at least one implementation, FIG. 2 may include a plurality of client computing devices 101, of which only one is shown for illustrative brevity, and remote servers 104, of which only 104, 104A, 104B, and 104C, are shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run a data sink stream reliability routing program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running a data sink stream reliability routing program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102.

Reliable input stream 250 may be any streaming data source capable of continuously sending data 502 to stream processor 252. The reliable input stream 250 can comprise data 502, as depicted in FIG. 5.

Figure 5:
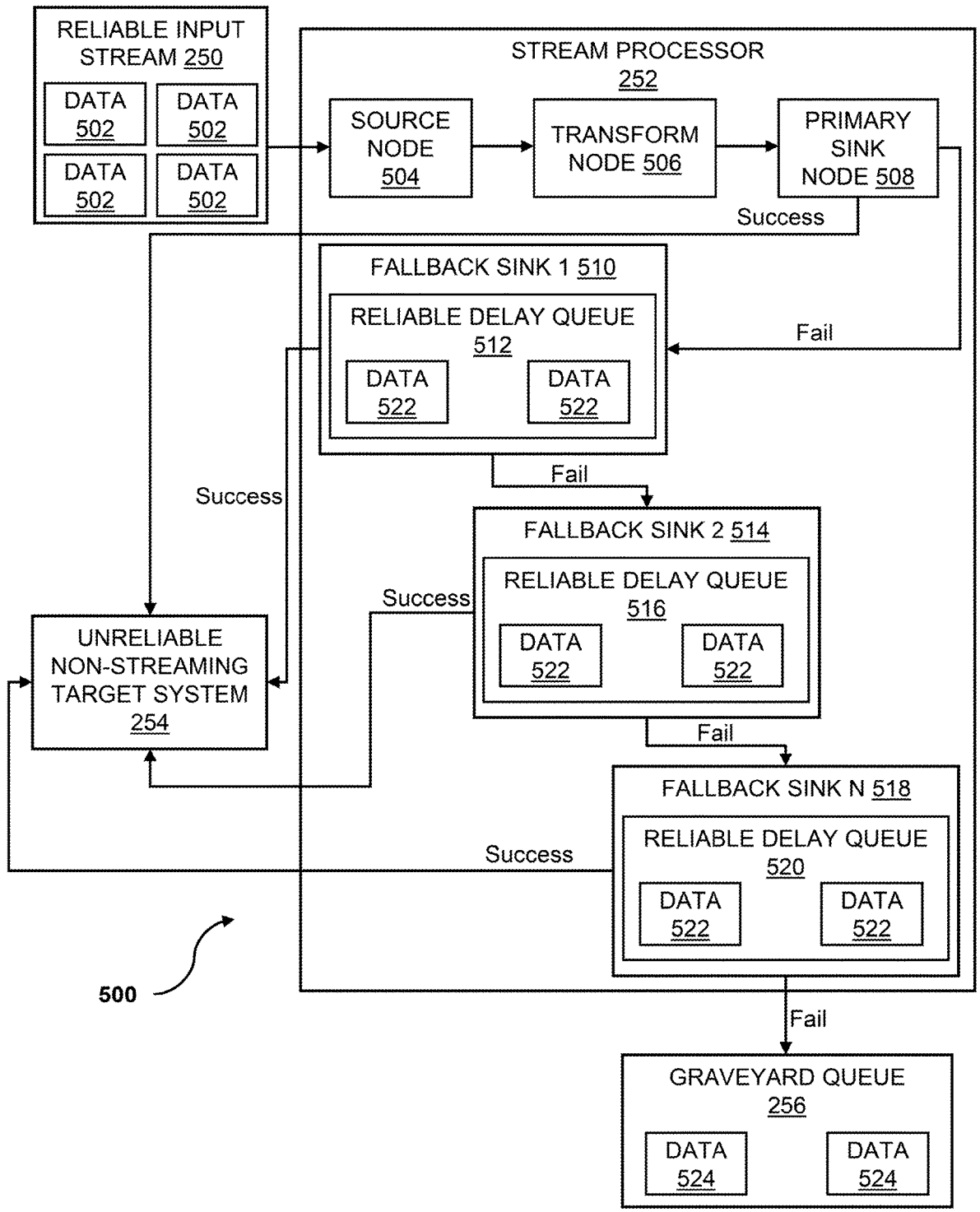
FIG. 5 is a system diagram illustrating an exemplary program environment of an implementation of a data sink stream reliability routing process according to at least one embodiment.

Stream processor 252 can comprise multiple daisy-chained sink nodes, such as source node 504, transform node 506, primary sink node 508, fallback sink 1 510, fallback sink 2 514, and fallback sink N 518, as depicted in FIG. 5. In some embodiments, the stream processor 252 may not comprise a transform node 506, for example when the incoming data 502 is already in a correct format and thus, the stream processor 252 does not need to perform any transformations on the data 502. The number of fallback sink nodes in a stream processor 252 can be determined by the unreliability of the unreliable non-streaming target system 254 and the unreliability of the network 102, such that the daisy chain may be extended to run as many fallback sinks as necessary to cover the bulk of occurring failure cases. For example, the more unreliable a non-streaming target system 254, the greater the number of fallback sink nodes comprised within the daisy chain of sink nodes. A fallback sink, such as 510, 514, and 518, may comprise a reliable delay queue, such as 512, 516, and 520, respectively. A reliable delay queue, such as 512, 516, and 520, may comprise failed data 522, i.e., data 502 which has failed at a previous sink node. Upon the failure of data 502 in a fallback sink node, such as 508, the data 502 can be sent to a subsequent fallback sink in the daisy chain of sink nodes, such as 510. The Stream processor 252 can be implemented using an external queue, such as Apache Kafka®. The stream processor 252 can continuously receive and process data 502 as it is received in batches from the reliable input stream 250.

Unreliable non-streaming target system 254 may be an output, such as an external data sink, that is capable of receiving processed data through the stream processor 252 from the reliable input stream 250.

The persistent graveyard queue 256 can comprise records of data 524 that have failed to be submitted to the unreliable non-streaming target system 254 at all fallback steps, for example, data that failed to be submitted to the unreliable non-streaming target system 254 from fallback sinks 510, 514, and 518, as depicted in FIG. 5. Upon the failure of failed data 522 at the last fallback sink in the daisy chain of sink nodes, for example, fallback sink n 518, the failed data 522 can be sent to the persistent graveyard queue 256.

According to the present embodiment, the data sink stream reliability routing code 200, "the program", may be a program capable of continuously reading data entering a stream processor via a reliable input stream, outputting processed data to an unreliable non-streaming target system via the stream processor, invoking, upon the completion of the outputting of a batch of data to the unreliable non-streaming target system, an asynchronous callback function, and passing, via a primary sink node, a list of failed record IDs of the batch to a first fallback sink within the daisy chain of sink nodes, while continuing to submit new batches of records to the non-streaming target system via the primary sink node. The program 200 may be located on client computing device 101 or remote server 104 or on any other device located within network 102. Furthermore, the program 200 may be distributed in its operation over multiple devices, such as client computing device 101 and remote server 104. The data sink stream reliability routing method is explained in further detail below with respect to FIG. 3.

Figure 3:
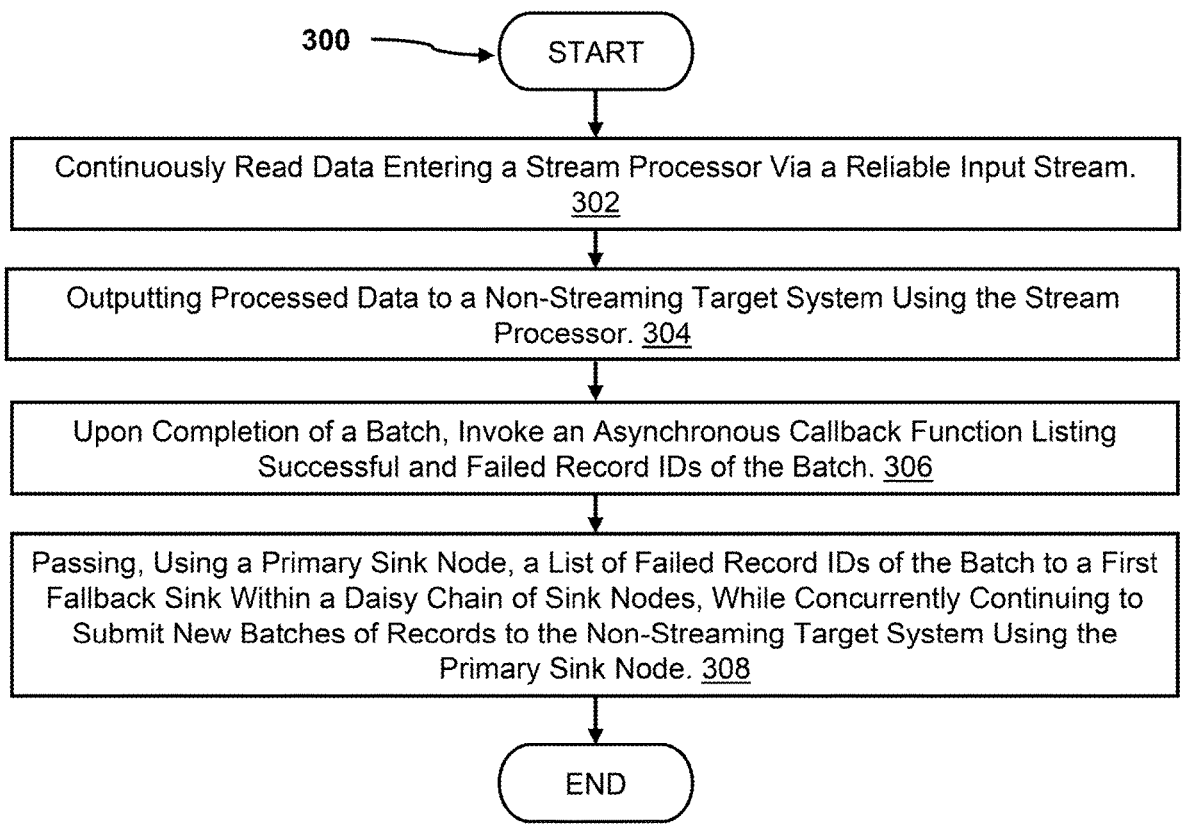
FIG. 3 is an operational flowchart illustrating a data sink stream reliability routing process according to at least one embodiment.

FIG. 3 is an operational flowchart illustrating a data sink stream reliability routing process according to at least one embodiment. At 302, the program 200 continuously reads data 502 entering a stream processor 252 via a reliable input stream 250. Data 502 can be sent to the stream processor 252 via the reliable input stream 250. The stream processor 252 can collect and process the received data as it is received from the reliable input stream 250. The first node in the daisy chain can be the primary sink node 508. The subsequent nodes in the daisy chain can be the fallback sink nodes, such as 510, 514, and 518, as depicted in FIG. 5. The last fallback sink node in the daisy chain can be referred to as fallback sink node N 518.

At 304, the program 200 outputs processed data to an unreliable non-streaming target system 254 using the stream processor 252. The primary sink node 508 in the stream processor 252 can submit records to the external unreliable non-streaming target system 254 in batches. A batch of data may comprise one or more records. The primary sink node 508 can commit the end offset of an entire batch of data to the unreliable non-streaming target system 254, regardless of any occurring data failures.

At 306, the program 200 invokes, upon the completion of the outputting of each batch of processed data to the unreliable non-streaming target system 254, an asynchronous callback function. The asynchronous callback function can list the successful record IDs and failed record IDs of a batch of data. Specifically, the program 200 can invoke an asynchronous callback function on the primary sink node 508 with a list of successful and failed records IDs as a parameter. The callback function can inspect the parameter list for the failed record IDs.

At 308, the program 200 passes, using a primary sink node, a list of failed record IDs of the batch to a first fallback sink 510 within the daisy chain of sink nodes, while concurrently continuing to submit new batches of records to the unreliable non-streaming target system 254 using the primary sink node 508. Upon finding one or more failed record IDs, the callback function can collect the failed record IDs in a new list. The program 200 can pass the list of failed record IDs to the subsequent fallback sink node within the daisy chain of sink nodes comprised within the stream processor 252 via the callback function. For example, the primary sink node's 508 callback function may receive the following list of record IDs:

(r1:s, r2:s, r3:f, r4:f, r5:s, r6:s, r7:f)

The callback function can collect the failed record IDs, r3, r4, and r7, from the list of record IDs, put them into a new list, and pass the new list to the next fallback sink within the daisy chain of sink nodes. Concurrently, the program 200 can continue to submit new batches of records to the unreliable non-streaming target system 254 via the primary sink node 508. The stream processor 252 can continuously receive and process data 502 as it is received in batches from the reliable input stream 250.

Figure 4:
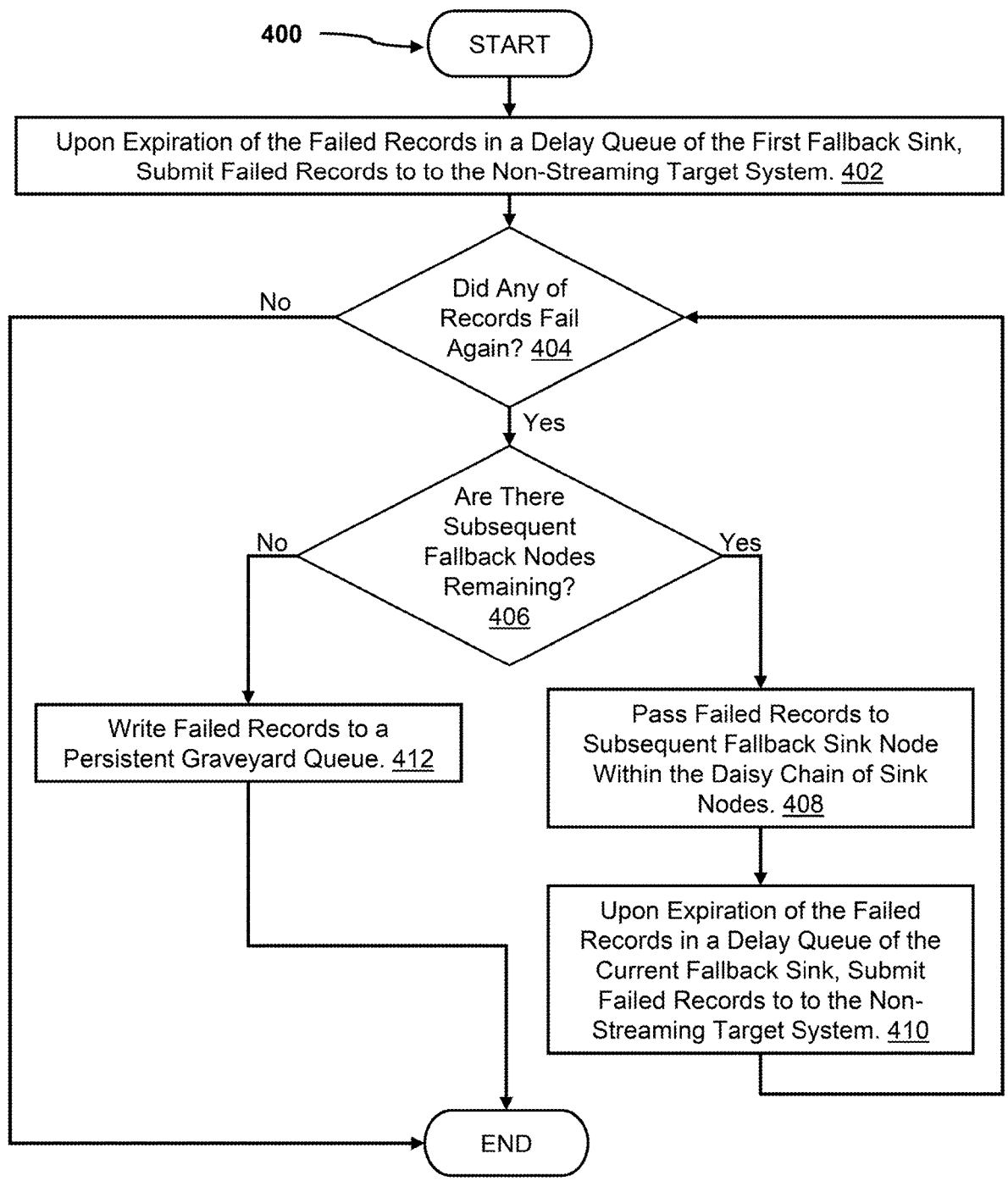
FIG. 4 is an operational flowchart illustrating a fallback sink node routing process according to at least one embodiment.

FIG. 4 is an operational flowchart illustrating a fallback sink node routing process according to at least one embodiment. At 402, upon the expiration of the failed records 522 in a delay queue 512 of the first fallback sink 510 within the daisy chain of sink nodes, the program 200 submits the failed records 522 to the unreliable non-streaming target system 254. Upon arrival at the first fallback sink 510, the failed records 522 can be placed in the reliable delay queue 512 in the fallback sink and can remain there until the records expire. Each fallback sink node within the fallback daisy chain can incorporate a reliable delay queue. The reliable delay queue can have an exponentially increasing delay per queue sink, such that the end-to-end fallback chain implements an exponential backoff scheme, for example, 100 ms, 200 ms, 400 ms, 800 ms, etc. In some embodiments, the reliable delay queue may have a constant increasing delay per queue sink, a linearly increasing delay per queue sink, among other increasing delay schemes per queue sink. Upon expiration of the failed records in a reliable delay queue, the program 200 submits them in a batch to the unreliable non-streaming target system 254. A fallback sink's batch record submissions may comprise contiguous or non-contiguous records, as the amount and order of records to be retried for submission to the unreliable non-streaming target system 254 depends on the failure(s) encountered at the previous submission step. A fallback sink may submit a single record as a batch submission or a group of records that comprises a collection of those batches of data that have failed submission from the previous submission step(s). Additionally, the number of sink nodes with reliable delay queues, the size in bytes of the reliable delay queue per fallback sink, and the retry time intervals at each sink step, can be determined by the unreliability of the unreliable non-streaming target system 254 and the unreliability of the network 102.

At 404, the program 200 determines whether any of the failed records 522 sent to the unreliable non-streaming target system 254 failed again. According to one implementation, in response to determining that one or more of the failed records 522 failed again (step 404, "YES" branch), the program 200 may continue to Step 406 to determine whether any subsequent fallback nodes are remaining within the daisy chain of sink nodes. Once the unreliable non-streaming target system 254 completes processing the batch of failed data 522, the program 200 can invoke an asynchronous callback function on the respective fallback sink within the daisy chain of sink nodes that submitted the failed records 522, for example, the first fallback sink 510, with a list of successful and failed records IDs as a parameter. The callback function can inspect the parameter list for failed record IDs to determine if any of the failed records failed again at the current fallback sink node. In response to determining that no failed records 522 failed again, i.e., all records 522 were successfully submitted to the unreliable non-streaming target system 254 (step 404, "NO" branch), the program 200 may terminate.

At 406, the program 200 determines whether any subsequent fallback nodes are remaining within the daisy chain of sink nodes. According to one implementation, in response to determining that subsequent fallback nodes are remaining within the daisy chain of sink nodes (step 406, "YES" branch), the program 200 may continue to Step 408 to pass the failed records 522 to the next fallback sink node within the daisy chain of sink nodes. The program 200 may determine that subsequent fallback nodes are remaining within the daisy chain of sink nodes based on the fallback queue length, i.e., the number of fallback sink nodes within the daisy chain of sink nodes. If the fallback queue length is longer than the current fallback sink node, i.e., the current fallback sink node is not the last fallback sink node within the daisy chain of sink nodes, the program 200 may determine that subsequent fallback sink nodes are remaining within the daisy chain of sink nodes. In response to determining that no subsequent fallback sink nodes are remaining within the daisy chain of sink nodes (step 406, "NO" branch), the program 200 may continue to step 412 to write the failed records to a persistent graveyard queue 256.

At 408, the program 200 passes the failed records 522 to the subsequent fallback sink node within the daisy chain of sink nodes. Upon one or more failed record IDs being found by the callback function during step 404, the callback function can collect the failed record IDs in a new list. The callback function can pass the new list of failed record IDs to the subsequent fallback sink node within the daisy chain of sink nodes. The program 200 can concurrently continue to submit expired previously failed records 522 to the unreliable non-streaming target system 254.

At 410, upon expiration of the failed records 522 in a delay queue within the current fallback sink, the program 200 submits the failed records 522 to the unreliable non-streaming target system 254. The program 200 can submit the failed records 522 to the unreliable non-streaming target system 254 in the same manner as in step 402, except that the program 200 submits the failed records 522 from the fallback sink within the daisy chain of sink nodes that the failed records were passed to in step 408, instead of the failed records 522 from within the first fallback sink 510.

At 412, the program 200 writes the failed records 522 to a persistent graveyard queue 256. When the last fallback node, such as fallback sink N 518 as depicted in FIG. 5, within the daisy chain of fallback sink nodes encounters a failed record 522, the fallback node can write it to a persistent graveyard queue 256. Any record 522 that fails to be submitted to the unreliable non-streaming target system 254 at all fallback steps, can be written, data 524 as depicted in FIG. 5, in the persistent graveyard queue 256, for manual troubleshooting of the problem entries. The persistent graveyard queue 256 can be capable of being manually reviewed. The failed records 524 can be stored in the persistent graveyard queue 256 for an indefinite period, thus, ensuring that no record 524 will ultimately be lost.

Referring now to FIG. 5, a system diagram illustrating an exemplary program environment 500 of an implementation of a data sink stream reliability routing process 300 is depicted according to at least one embodiment. Here, the environment 500 comprises a reliable input stream 250, a stream processor 252, an unreliable non-streaming target system 254, and a persistent graveyard queue 256. The reliable input stream 250 may comprise one or more batches of data 502. The stream processor may comprise a source node 504, a transform node 506, primary sink node 508, fallback sink 1 510, fallback sink 2, and fallback sink "N" 518. Fallback sink 1 510 may comprise a reliable delay queue 512 and failed data 522. Fallback sink 2 514 may comprise a reliable delay queue 516 and failed data 522. Fallback sink N 518 may comprise a reliable delay queue 520 and failed data 522. The exemplary program environment 500 details the interactions between the reliable stream input 250 and the source node 504, the source node 504 and the transform node 506, the primary sink node 508 and the unreliable non-streaming target system 254 upon recognition of successful batch(-es) of data 502, the primary sink node 508 and the fallback sink 1 510 upon recognition of the failure of batch(-es) of data 502. Additionally, the exemplary program environment 500 details the interactions between the fallback sink 1 510 and the unreliable non-streaming target system 254 upon successful transfer of batch(-es) of failed data 522, the fallback sink 1 510 and the fallback sink 2 514 upon the failure of data 522 being sent to the unreliable non-streaming target system 254, the fallback sink 2 514 and the unreliable non-streaming target system 254 successful transfer of batch(-es) of failed data 522, and the fallback sink 2 514 and the fallback sink N 518 upon the failure of data 522 being sent to the unreliable non-streaming target system 254. Furthermore, the exemplary program environment 500 details the interactions between the fallback sink N 518 and the unreliable non-streaming target system 254 upon successful transfer of batch(-es) of failed data 522, and the fallback sink N 518 and the persistent graveyard queue 256 upon the failure of data 522 being sent to the unreliable non-streaming target system 254 at all fallback steps. The persistent graveyard queue 256 may comprise one or more batches of data 524 that failed to be submitted at all fallback steps in the daisy chain of sink nodes.

It may be appreciated that FIGS. 2 through 5 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for handling an unreliable data sink, the method comprising:
   reading, continuously, via a stream processor, a batch of data entering the stream processor via a reliable input stream, the stream processor comprising a daisy chain of sink nodes, wherein a first sink node of the daisy chain is a primary sink node and a subsequent plurality of sink nodes in the daisy chain are fallback sink nodes;
   outputting, via the stream processor, processed data to a non-streaming target system;
   upon completion of the processed data to the non-streaming target system, invoking on the primary sink node, an asynchronous callback function listing successful and failed record IDs of the processed data; and
   passing, via the primary sink node, one or more failed records to a first fallback sink within the daisy chain of sink nodes, while the primary sink node concurrently continues submitting one or more new batches of data to the non-streaming target system.

2. The method of claim 1, further comprising:
   placing the one or more failed records into a delay queue within the first fallback sink;
   storing the one or more failed records in the delay queue until they expire;
   upon expiration, submitting the one or more failed records to the non-streaming target system; and
   upon one or more of the failed records failing at the first fallback sink, sending the one or more failed records that failed at the first fallback sink to a subsequent fallback sink in the daisy chain of sink nodes.

3. The method of claim 2, further comprising:
   upon a fallback sink node subsequent to the first fallback sink within the daisy chain of sink nodes encountering a failed record that has failed again at the current fallback sink node, passing the failed record that has failed again to a subsequent fallback sink node within the daisy chain of sink nodes; and
   concurrently continuing to submit expired previously failed records to the non-streaming target system.

4. The method of claim 3, further comprising:
   upon one or more failed records failing at a last fallback node in the daisy chain of sink nodes, writing the one or more failed records that failed at the last fallback node to a persistent graveyard queue.

5. The method of claim 4, wherein each delay queue of a fallback node within the daisy chain of sink nodes has an exponentially increased delay downstream the daisy chain of sink nodes.

6. The method of claim 4, wherein the daisy chain of sink nodes comprises a source node, a transformer node, the primary sink node, the first fallback sink node, and at least one subsequent fallback sink node.

7. The method of claim 4, wherein the persistent graveyard queue is capable of being manually reviewed.

8. A computer system for handling an unreliable data sink, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   reading, continuously, via a stream processor, a batch of data entering the stream processor via a reliable input stream, the stream processor comprising a daisy chain of sink nodes, wherein a first sink node of the daisy chain is a primary sink node and a subsequent plurality of sink nodes in the daisy chain are fallback sink nodes;
   outputting, via the stream processor, processed data to a non-streaming target system;
   upon completion of the processed data to the non-streaming target system, invoking on the primary sink node, an asynchronous callback function listing successful and failed record IDs of the processed data; and
   passing, via the primary sink node, one or more failed records to a first fallback sink within the daisy chain of sink nodes, while the primary sink node concurrently continues submitting one or more new batches of data to the non-streaming target system.

9. The computer system of claim 8, further comprising:
   placing the one or more failed records into a delay queue within the first fallback sink;

storing the one or more failed records in the delay queue until they expire;

upon expiration, submitting the one or more failed records to the non-streaming target system; and upon one or more of the failed records failing at the first fallback sink, sending the one or more failed records that failed at the first fallback sink to a subsequent fallback sink in the daisy chain of sink nodes.

10. The computer system of claim 9, further comprising:

upon a fallback sink node subsequent to the first fallback sink within the daisy chain of sink nodes encountering a failed record that has failed again at the current fallback sink node, passing the failed record that has failed again to a subsequent fallback sink node within the daisy chain of sink nodes; and concurrently continuing to submit expired previously failed records to the non-streaming target system.

11. The computer system of claim 10, further comprising:

upon one or more failed records failing at a last fallback node in the daisy chain of sink nodes, writing the one or more failed records that failed at the last fallback node to a persistent graveyard queue.

12. The computer system of claim 11, wherein each delay queue of a fallback node within the daisy chain of sink nodes has an exponentially increased delay downstream the daisy chain of sink nodes.

13. The computer system of claim 11, wherein the daisy chain of sink nodes comprises a source node, a transformer node, the primary sink node, the first fallback sink node, and at least one subsequent fallback sink node.

14. The computer system of claim 11, wherein the persistent graveyard queue is capable of being manually reviewed.

15. A computer program product for handling an unreliable data sink, the computer program product comprising:

one or more computer-readable tangible storage medium and program instructions stored on at least one of the one or more tangible storage medium, the program instructions executable by a processor to cause the processor to perform a method comprising:

reading, continuously, via a stream processor, a batch of data entering the stream processor via a reliable input stream, the stream processor comprising a daisy chain of sink nodes, wherein a first sink node of the daisy chain is a primary sink node and a subsequent plurality of sink nodes in the daisy chain are fallback sink nodes;

outputting, via the stream processor, processed data to a non-streaming target system;

upon completion of the processed data to the non-streaming target system, invoking on the primary sink node, an asynchronous callback function listing successful and failed record IDs of the processed data; and passing, via the primary sink node, one or more failed records to a first fallback sink within the daisy chain of sink nodes, while the primary sink node concurrently continues submitting one or more new batches of data to the non-streaming target system.

16. The computer program product of claim 15, further comprising:

placing the one or more failed records into a delay queue within the first fallback sink;

storing the one or more failed records in the delay queue until they expire;

upon expiration, submitting the one or more failed records to the non-streaming target system; and upon one or more of the failed records failing at the first fallback sink, sending the one or more failed records that failed at the first fallback sink to a subsequent fallback sink in the daisy chain of sink nodes.

17. The computer program product of claim 16, further comprising:

upon a fallback sink node subsequent to the first fallback sink within the daisy chain of sink nodes encountering a failed record that has failed again at the current fallback sink node, passing the failed record that has failed again to a subsequent fallback sink node within the daisy chain of sink nodes; and concurrently continuing to submit expired previously failed records to the non-streaming target system.

18. The computer program product of claim 17, further comprising:

upon one or more failed records failing at a last fallback node in the daisy chain of sink nodes, writing the one or more failed records that failed at the last fallback node to a persistent graveyard queue.

19. The computer program product of claim 18, wherein each delay queue of a fallback node within the daisy chain of sink nodes has an exponentially increased delay downstream the daisy chain of sink nodes.

20. The computer program product of claim 19, wherein the daisy chain of sink nodes comprises a source node, a transformer node, the primary sink node, the first fallback sink node, and at least one subsequent fallback sink node.

* * * * *